United States Patent Office 2,892,841
Patented June 30, 1959

2,892,841
PROCESS FOR AMINATING NITROGEN-CONTAINING HETEROCYCLIC COMPOUNDS

Bernard Rudner, Baltimore, Md., assignor to W. R. Grace & Co., New York, N.Y., a corporation of Connecticut No Drawing. Application April 2, 1956
Serial No. 575,347

10 Claims. (Cl. 260—288)

This invention relates to a process for aminating aromatic heterocyclic compounds characterized by the presence of at least one tertiary N atom in a conjugately unsaturated heterocyclic ring. The amino derivatives prepared by the novel method of the present invention are alpha amino derivatives, i.e., those in which the sole hydrogen on the annular carbon atom attached to the annular tertiary N atom by a double bond is replaced by an amino group. In a specific aspect, the present invention is directed to a novel method for preparing alpha amino derivatives of compounds such as pyridine and its fused ring derivatives, for example, 2-aminopyridine, 2-aminoquinoline, and alpha amino (or 1-amino) isoquinoline.

Heretofore, 2-aminoquinoline, for example, has been prepared by contacting quinoline 2-sulfonic acid with an ammonia solution containing about 1 part zinc chloride and the mixture heated for several hours in a closed vessel at about 135° C. 2-aminopyridine has been prepared commercially by reacting pyridine with sodamide, whereby sodamide forms an addition product with pyridine, that upon hydrolysis yields sodium hydroxide, ammonium hydroxide, hydrogen, and 2-aminopyridine. The 2-amino derivatives of both pyridine and quinoline are also prepared by reacting quinoline or pyridine with ammonia in the presence of a Raney nickel catalyst. This latter process is carried out in an autoclave at between about 200° and 490° C. over a period of about 17 hours. While the latter method offers obvious advantages over either of the former processes for preparing the 2-amino compounds, the process is time consuming, requires the addition of external heat, and necessitates special pressure equipment. Accordingly, a process which could be carried out at atmospheric pressure, without the addition of heat, and which would employ cheap reagents should be commercially attractive. With the advent of an economically very attractive method of preparing chloramine by the vapor phase reaction between ammonia and chlorine gas, a low cost reagent has been provided.

In accordance with the present invention, liquid pyridine, quinoline or isoquinoline is contacted with chloramine at atmospheric pressure and temperatures ranging from about —10° C. to about 100° C. An unreactive solvent may be conveniently used as a reaction medium, but the presence of such a solvent is not essential. The term "unreactive" describes solvents that do not preferentially combine with the product or the reactant.

As the reaction proceeds there is formed a dark solid which is insoluble in the starting heterocyclic compound. The solid is separated from the reaction mixture, and a major portion of the alpha amino compound thus formed is generally present in this dark solid as the hydrochloride salt. The hydrochloride of the alpha amino compound is recovered from the solid by fractional crystallization or equivalent methods. A minor portion of the alpha amino compound remains in reaction mixture as the free base and may be recovered by preferential extraction, fractional distillation, or other standard physical methods of separation. Alternately, the reaction mixture may be acylated, e.g. with acetic anhydride; the acylated α-aminoheterocyclic may then be freed of unacylated parent heterocycle by suitable and common laboratory procedure such as distillation. The acylated product is deacylated by hydrolysis.

While the present process has thus far been described with reference only to chloramine, the present invention also contemplates the use of chloramine diluted with an inert gas such as nitrogen, or with a diluent gas such as ammonia which undergoes reaction to form ammonium chloride, but which does not inhibit formation of the desired aminated products. Generally it will be most convenient to employ the chloramine-ammonia mixture resulting from the above-noted chloramine synthesis. While the process thus far described utilizes excess basic heterocycle as solvent, it is not necessary to so limit the invention. I have found that unreactive solvents such as the alkanes (e.g. hexane) aromatics (e.g. xylene), haloaromatics (e.g. chlorobenzene), ethers (e.g. dioxane) and other classes could be used advantageously in place of excess heterocycle. The qualification "unreactive" is not limited to organic solvents, since I have found that aqueous pyridine undergoes this reaction.

The following non-limiting examples illustrate the general method of the present invention.

*Example I*

A chloramine-nitrogen-ammonia gas stream containing a total of approximately 6.6 g. $ClNH_2$, was passed, over a period of 30 minutes, into a flask containing 100 ml. of pure pyridine. Within a very few minutes, an exothermic reaction started, the pyridine turned dark brown, and a crystalline precipitate was formed. A cold water bath was used to keep the reaction temperature below 60° C.; in spite of this bath the reaction temperature remained at 48–52° C. Chloramine was absorbed almost quantitatively; even with relatively poor gas-liquid contact less than 4% of the chloramine passed through the pyridine unreacted. Within five minutes after the chloramine stream had been shut-off, all of the chloramine had been reacted (i.e.: had lost its power to oxidize acidified KI solution to iodine). After 24 hours, the reaction mixture was filtered, the dark filtrate allowed to evaporate dry, and the pyridine-washed, brown solid was dried. It weighed 5.1 g., and was shown, by standard analytical procedures, to be a mixture of several compounds including ammonia chloride and 2-aminopyridine hydrochloride. The aminopyridine was isolated as follows: The crude hydrochloride mixture was just neutralized with sodium bicarbonate; it was acylated with excess acetic anhydride, and evaporated in vacuo to dryness. The residual solid was extracted with chloroform in five portions of 100 ml. each and the combined chloroform extract in turn extracted with three 50 ml. portions of 1 N HCl. The acid extract was made just alkaline with solid $Na_2CO_3$, and re-extracted with three 100 ml. portions of chloroform. Evaporation of the chloroform solution gave 2-acetylaminopyridine, which, after recrystallization, melted at 70–71° C. (literature value 71° C.). Boiling hydrochloric acid solutions converted this product to 2-aminopyridine hydrochloride, a hygroscopic solid melting at 215° C. (literature value 217° C.). The action of caustic on the aqueous hydrochloride gave water-soluble 2-aminopyridine, M.P. 58–8.5° (literature value 60° C.). Infra-red and ultra-violet absorption studies on the hydrochloride confirmed its identity.

The black reaction filtrate was evaporated to dryness in an air stream at room temperature. From the dark gum thus obtained there were isolated, by fractional solubilization, 2-aminopyridine, M.P. 61° C. (after recrystallization from hexane) and 2-aminopyridine hydrochloride, M.P. 215° C. (after recrystallization from 2-propanol).

In other experiments with the same reactants, it was demonstrated that external conditions (viz: solvent used, temperature, pressure) altered the yields, the ratio of aminopyridine to its hydrochloride, the ratio of both to other organic products and even the nature of the products. Reaction at higher temperatures favored increased yields of organic products, including the desired aminopyridine.

From a reaction run at 10–15° C. there was obtained a lower yield of products as well as a lower ratio of aminopyridine hydrochloride to aminopyridine. Visible reaction at −40° C. was very slow; not until the mixture had warmed up to about −10° C. was there a rapid and exothermic formation of a solid. Fractional crystallization of this precipitate from absolute alcohol gave pure 2-aminopyridine hydrochloride, M.P. 215–216° C., which was characterized by its conversion (when treated with the appropriate reactant) to 2-aminopyridine, M.P. 53–54° C.; 2-benzenesulfonylaminopyridine, M.P. 149–150° C., and 2-(4-dimethylaminobenzylidene)aminopyridine, M.P. 119–120° C. Evaporation of the black filtrate (from which the 2-aminopyridine hydrochloride was obtained) left a dark tar, from which a minor quantity of 2-aminopyridine was isolated. A similarly small quantity of the same substance was found to be adsorbed on the initial precipitate.

*Example II*

In aqueous solution, this reaction goes with greater vigor, and by a somewhat different route, it is believed. A 90:10 water-pyridine mixture (kept in an ice-bath) treated over 74 minutes, with approximately 10 g. of chloramine (in a gaseous mixture as before), gave an immediate, exothermic reaction which raised the solution temperature to 30° C. However, the chloramine uptake was neither as rapid nor as quantitative as in anhydrous reactions; over 10% of the chloramine passed through the reaction mixture unchanged. From the hygroscopic mixture of white, yellow, and brown solids obtained on evaporating the clear reaction medium there were obtained crude 2-aminopyridine and 2-aminopyridine hydrochloride, M.P. 51–53° and 200–210° C., respectively. The latter product was contaminated by an appreciable quantity of another salt tentatively identified as 1-aminopyridinium chloride,

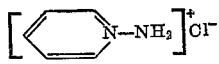

M.P. 152–154° C.

When the aqueous reaction was run without any temperature control, the solution temperature rose quickly to 60–65° C., then gradually dropped to about 55° C. The chloramine uptake was almost quantitative. The mottled solid obtained on evaporation analyzed 55.7% ionizable chloride (pure ammonium chloride analyzes 66.4% Cl), and was found to be a mixture comprising 2-aminopyridine, 2-aminopyridine hydrochloride, and 1-aminopyridinium chloride. The two isomeric salts were differentiated on the basis of their benzenesulfonyl derivatives, 2-aminopyridine hydrochloride forming an acid and alkali-soluble derivative (Reaction A) and 1-aminopyridinium chloride forming an alkali-insoluble, acid-soluble derivative (Reaction B).

(A)

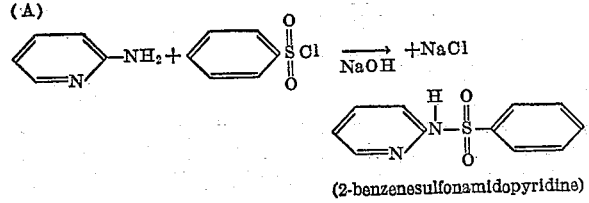

(2-benzenesulfonamidopyridine)

(B)

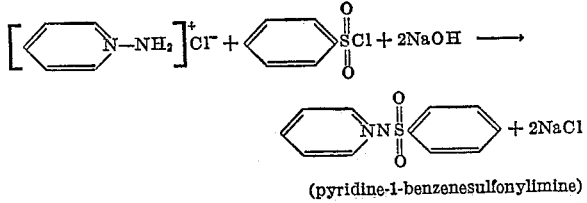

(pyridine-1-benzenesulfonylimine)

*Example III*

Passage of 10 g. of chloramine, as a gaseous mixture with $NH_3$ and $N_2$, into a large excess of quinoline (essentially as described in Example I) gave a reaction similar to that obtained when using pyridine. The temperature rose from 27° C. to 60° C. in the first third of a 45 minute gasification; a cooling bath was used thereafter to keep the reaction temperature at 55–60° C. Precipitate started to form within 10 minutes of the start of the reaction; chloramine absorption and conversion was 92.3% complete. The dried precipitate was, by chloride analysis, 61% pure 2-aminoquinoline hydrochloride (see Reaction C).

(C)

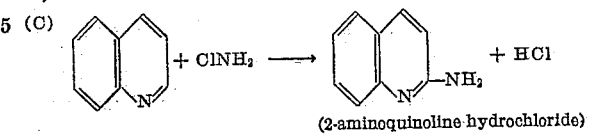

(2-aminoquinoline hydrochloride)

Part of this desirable product was isolated by tedious fractional recrystallizations from ethanol and chloroform. Recrystallization to a constant melting point gave pure 2-aminoquinoline hydrochloride, M.P. 222–223° C. Its identity was established by conversion (using appropriate reactants) to its free base, 2-aminoquinoline, M.P. 126–127° C., and to 2-aminoquinoline picrate, M.P. 251–252.5° C. Another portion of the original reaction precipitate was dissolved in a small quantity of hot water, charcoaled, and then treated with excess 40% aqueous NaOH solution. On cooling, the reaction mixture plates of 2-aminoquinoline precipitated, M.P. 127.5–127.8° after recrystallization (literature value 129° C.)

Evaporation of the black quinoline filtrate in vacuo gave a dark tar from which 2-aminoquinoline and 2-aminoquinoline hydrochloride were isolated. Of the several products of this reaction, the aminoquinoline and its hydrochloride were the most important yieldwise, being isolated in well over 40% of the theoretical yield. The ratio of hydrochloride formed to free amine was almost 10:1.

*Example IV*

Replacement of the quinoline of Example III with isoquinoline,

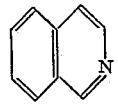

25 ml. in 50 ml. mixed xylenes, gave the same exothermic reaction and dark precipitate. Because of the dilution with an inert solvent, however, the chloramine uptake was not as nearly quantitative as that described in Example III. The tan solid which precipitated was a mixture of several compounds, including ammonium chloride and 1-aminoquinoline hydrochloride in approximately a 3:1 ratio. An aqueous solution of this precipitate, washed with carbon tetrachloride and then charcoaled, gave, on addition of sodium hydroxide, 1-aminoisoquinoline. This product, after recrystallization from water, formed plates melting at 122.5–123.5° C. (literature value 123° C.). The hydrochloride, prepared by evaporating to dryness an HCl solution of the recrystallized free base, melted at 234–235.5° C. (literature value 233–234° C.). A clarified aqueous solution of the precipitate, free of occluded isoquinoline, gave with aqueous picric acid, 1-aminoisoquinoline picrate, yellow micro-crystals melting at 290–291.5° C. (literature value 290–291° C.). The tan reaction precipitate, as isolated, was also found to contain a small quantity of the free base, 1-aminoisoquinoline, and a smaller quantity of the isomeric 3-aminoisoquinoline. These products were separable from the aforementioned components of the solid by virtue of their water-insolubility. In addition, the water-soluble portion of the precipitate was found to contain, in minor quantities, an ionized organic chloride whose high water solubility, stability toward alkali, and reactions with sodium picrate and potassium hexafluorophosphate suggest that it is 2-aminoisoquinolinium chloride.

Evaporation of the dark filtrate from the reaction mixture gave a black, tacky solid, roughly ⅔ the weight of the reaction precipitate. Extraction with water gave, after purification, 1-aminoisoquinoline hydrochloride, M.P. 232–233.5° C. Extraction with boiling water gave, on cooling, appreciably more 1-aminoisoquinoline as flat plates, M.P. 118–121° C. (121–122° C. after two recrystallizations from water). There is some evidence, e.g. reaction with potassium hexafluorophosphate, that both the hot and cold aqueous extracts contain a small quantity of a solid tentatively identified as 2-aminoisoquinolinium chloride. It is rather surprising that such a highly polar compound would be found in the reaction filtrate, instead of the precipitate.

In summary, it should be noted that the reaction of gaseous chloramine with isoquinoline gave a mixture of products including 1-aminoisoquinoline (a), 1-aminoisoquinoline hydrochloride (b), 3-aminoisoquinoline (c), and 2-aminoisoquinolinium chloride (d) (see Reaction D below) in an approximate yield ratio of 4:20:1:1.

(D)

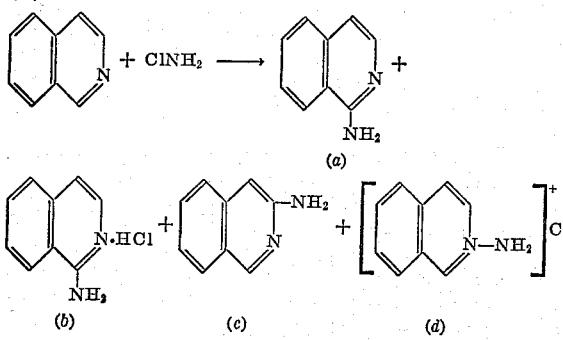

*Example V*

Replacement of isoquinoline in the preceding example by a like quantity of α-lutidine (2,4-dimethylpyridine), gave a similar reaction, although somewhat less exothermic. The reaction precipitate, lighter in color than that of Example IV, consisted chiefly of ammonium chloride, the hydrochloride and free base of 2-amino-4,6-dimethylpyridine, and a smaller quantity of a dark, water-insoluble, acid-soluble solid which I have tentatively identified as the novel, 2,4-lutidine-1-imine. The two major products, which occur in the precipitate in approximately a 7:1 ratio, were separated from the rest of the precipitate by dissolving them in cold water. By making this aqueous extract alkaline and chilling, I precipitated 2-amino-4,6-lutidine, dull plates melting at 65–67° C. Its hydrochloride, obtained from the free base by the method described in Example III, melted with decomposition at approximately 221° C. The water-insoluble portion of the reaction precipitate gave, on extraction with 5% HCl, followed by subsequent neutralization, additional 2-amino-4,6-lutidine (this is considered proof that the free base occurs as such in the reaction precipitate). The mother liquor from this neutralization step was found to contain traces of a highly hygroscopic water-soluble solid which gave a precipitate with KPF₆.

This suggests that a second water-insoluble component of the initial precipitate was the novel 2,4-lutidine-1-imine (a), converted by HCl to the water-soluble 1-amino-2,4-lutidinium chloride (b) shown hereunder:

(E)

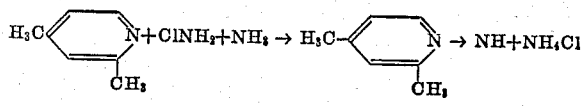

(a)

(F)

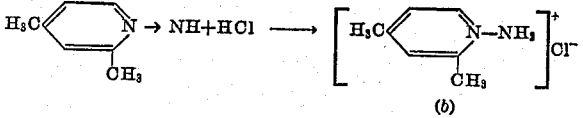

(b)

From the reaction filtrate was obtained, on evaporation, a shiny black-brown, amorphous solid, a mixture containing 2-amino-4,6-lutidine; (in small quantities) its hydrochloride, 1-aminolutidinium chloride; and 2,4-lutidine-1-imine, in approximately a 10:1:1:3 ratio. It can thus be seen that the yield of 2-aminolutidine and its salt is smaller than the corresponding yield from pyridine under the conditions employed.

*Example VI*

Oxine, more properly called 8-hydroxyquinoline, 25 g. in 100 ml. dimethylformamide, was saturated with ammonia to form a yellow suspension of its ammonium salt (Reaction G), then subjected to a chloramine gas stream as described in Example I. An exothermic reaction ensued.

(G)

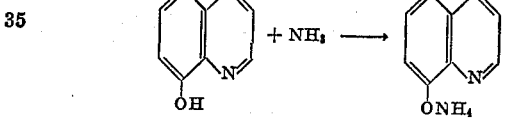

The mixture turned in color from yellow to orange to deep red; a phase-change was observed in the solid; and it was necessary to use a cold water-bath to hold the temperature of the reaction mixture down to 55° C. Chloramine uptake was quantitative and rapid. By the time the reaction mixture had cooled to room temperature after gasification, the chloramine had all reacted. The solid was filtered off and examined; it was found to be largely ammonium chloride. However, extraction of the product with 2-propanol gave, on evaporation of the solvent, a dark mixture containing 2-amino-8-hydroxyquinoline (as its ammonium salt, M.P. 210° C. (d)), and a smaller quantity of a dark solid believed to be 1-amino-8-hydroxyquinolinium betaine.

Evaporation of the reaction filtrate gave an appreciable quantity of dark solid. After removal of the unreacted hydroxyquinoline (2.8% of the starting weight), it was shown to be chiefly 2-amino-8-hydroxyquinoline (a), M.P. 60–61.5° C. There was also present a very small quantity of the compound believed to be the betaine (b).

(H)

[chemical structures showing reaction of 8-hydroxyquinoline ammonium salt with ClNH₂ to give (a) and (b)]

(a)    (b)

*Example VII*

A 5% solution of 8-hydroxyquinoline-5-sulfonic acid in 15% NH₄OH, containing 1 g. of the sulfonic acid, was treated dropwise, over 45 minutes at 10–15° C., with three equivalents of aqueous chloramine (prepared according to the procedure in Inorganic Syntheses). After being allowed to stand over night, the solution had turned from yellow to green. The solution was evaporated to dryness under aspirator vacuum. Extraction of the chloramine-free greenish residue with 2-propanol gave a very low yield of a chloride-free solid to which was tentatively assigned the structure 1-amino-8-hydroxy-5-sulfoquinolinium betaine. Extraction of the 2-propanol-insoluble part of the product with concentrated hydrochloric acid gave, as residue, a mixture of sodium chloride and, presumably, 2-amino-8-hydroxy-5-sulfoquinoline hydrochloride. The latter product, on extraction with ethanol and evaporation, was converted to the free base and HCl (which was largely lost on evaporation). The product thus obtained 2-amino-8-hydroxyquinoline-5-sulfonic acid, was a greenish yellow solid that decomposed without melting above 250° C. It was moderately soluble in water, increasingly so in alkali, and less so in concentrated acid. It formed an S-benzylisothiuronium salt that decomposed at 187–189.5° C.

In subsequent experiments it was found possible to add sodium hypochlorite solution to the ammonium salt of oxinesulfonic acid and isolate a small yield of the desired 2-amino derivative. The low yield and the difficulty in obtaining a pure compound, however, countervail the simplicity of the initial operation.

In addition to the above mentioned experiments, the following results have been obtained:

| Ex. | Starting base | Product and structure | Description of reaction |
|---|---|---|---|
| VIII | β-Picoline | 2-amino-6-methyl-pyridine and hydrochloride | Some evidence for formation of 4-amino. Amine to salt ratio approximately 1:8. Overall yield less than Example I. |
| IX | γ-Picoline | 2-amino-4-methyl-pyridine and hydrochloride | Yield less than Example VIII. Product ratio almost the same. |
| X | 2,6-lutidine | 4-amino-2,6-dimethylpyridine | Crude starting base. Low yield of product, no hydrochloride. Evidence for N-aminolutidinium chloride. |
| XI | Nicotinic acid | 6-aminonicotinic acid | Had to prepare anhydrous NH$_4$ salt first. No hydrochloride or other isomers. Yield fair. |
| XII | Quinaldine | 4-aminoquinaldine and hydrochloride | Poor yield. Strong evidence for 1-aminoquinaldinium compound. |

It is obvious that my novel reaction is applicable to a wide range of substituted pyridines and their fused ring homologues. For example, a list of other suitable pyridine derivatives would include pyridoxin, nicotinamide (and its diethyl homologue, the heart stimulant, nikethamide), 2-, 3-, and 4-vinylpyridine; the halopyridines; dipyridyl; 5,6,7,8-tetrahydroquinoline, 4-benzylisoquinoline, etc. In addition to the treatment of pyridine and its fused ring derivatives, quinoline and isoquinoline, the process of the present invention provides a method for aminating the carbon atom attached to the tertiary N atom by a double bond in a wide variety of N-containing heterocycles. This group includes compounds of the oxazole, thiazole, diazole, diazine, and triazine families, and the purines.

The major value of my novel process is in the direct preparation of commercial and potentially commercial products by a simple, hazard-free reaction that requires no autoclaves or similar expensive equipment. Thus manufacture of 2-aminopyridine, an important dye, drug and polymer intermediate, now requires a hazardous reaction in liquid ammonia, entailing the use of expensive autoclaves and recycling systems. By my novel reaction, I have prepared 2-aminopyridine at atmospheric pressure, in an open system requiring no liquid ammonia. Aminonicotinic acid, a valuable anti-metabolite, is at present prepared by amination of β-picoline, acylation of the amino group for protection, oxidation of the —CH$_3$ to —CO$_2$H, and then hydrolysis to the desired product. My present invention provides a direct amination of nicotinic acid (itself directly obtainable from the picoline), and therefore makes possible a 2-step process for the manufacture of the anti-metabolite.

I claim:
1. A process for preparing the alpha amino derivative of an aromatic compound containing a sole tertiary nitrogen atom in a conjugately unsaturated six-membered ring, wherein said compound at —10 to 100° C. is subjected to the action of chloramine whereby the hydrogen on the annular carbon atom attached by a double bond to said tertiary nitrogen is replaced by the —NH$_2$ group of said chloramine and recovering said alpha amino derivative of said aromatic compound from the reaction mixture.

2. A process according to claim 1 wherein the chloramine is introduced as part of a gas stream beneath the surface of the aromatic compound, said compound being in the liquid phase.

3. A process according to claim 1 wherein the chloramine is introduced as part of a gas stream beneath the surface of the aromatic compound, said compound being dissolved in an unreactive solvent.

4. A process according to claim 1 wherein the aromatic compound is pyridine.

5. A process according to claim 1 wherein the aromatic compound is quinoline.

6. A process according to claim 1 wherein the aromatic compound is isoquinoline.

7. A process according to claim 1 wherein the aromatic compound is 2-picoline.

8. A process according to claim 1 wherein the aromatic compound is 2,4-lutidine.

9. A process for preparing alpha amino derivatives of aromatic compounds selected from the group consisting of pyridine, picoline, lutidine, quinoline and isoquinoline which comprises reacting said liquid aromatic compound at —10 to 100° C. with chloramine whereby the hydrogen atom on the annular carbon atom attached to the nitrogen atom of said aromatic compound is replaced by the amino group of said chloramine and recovering the resultant alpha amino derivative from the reaction mixture.

10. A process according to claim 9 wherein the aromatic compound is dissolved in an unreactive solvent.

References Cited in the file of this patent

C. E. Boatman: "Ph. D. Thesis," The Ohio State University, 1951, pp. 32 and 64.